United States Patent
Klotz et al.

(10) Patent No.: US 6,578,537 B2
(45) Date of Patent: Jun. 17, 2003

(54) WELDED INTAKE DEVICE FOR AN INTERNAL COMBUSTION ENGINE

(75) Inventors: Arthur Klotz, Remseck (DE); Ingo Koch, Ludwigsburg (DE); Herbert Pietrowski, Pleidelsheim (DE); Matthias Teschner, Ludwigsburg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/158,190

(22) Filed: May 31, 2002

(65) Prior Publication Data

US 2002/0195075 A1 Dec. 26, 2002

(30) Foreign Application Priority Data

Jun. 1, 2001 (DE) .......................... 101 26 875

(51) Int. Cl.$^7$ .............................. F02M 35/10
(52) U.S. Cl. ..................... 123/184.21; 123/184.24; 123/184.42; 123/184.47; 123/184.61
(58) Field of Search .................. 123/184.21–184.61

(56) References Cited

U.S. PATENT DOCUMENTS

| | | | | |
|---|---|---|---|---|
| 6,092,499 A | * | 7/2000 | Spannbauer | 123/184.61 |
| 6,098,586 A | * | 8/2000 | Blommer | 123/184.21 |
| 6,234,132 B1 | * | 5/2001 | Kopec et al. | 123/183.34 |
| 6,321,708 B1 | * | 11/2001 | Wehner et al. | 123/184.61 |
| 6,446,591 B1 | * | 9/2002 | Chae et al. | 123/184.61 |

FOREIGN PATENT DOCUMENTS

| EP | 0568560 | 3/1997 |
|---|---|---|
| WO | WO 92/12845 | 8/1992 |

* cited by examiner

Primary Examiner—Marguerite McMahon
(74) Attorney, Agent, or Firm—Crowell & Moring LLP

(57) ABSTRACT

An intake device for an internal combustion engine, comprising welded shells joined along a partition line, in which the partition line is provided with a region for producing inclined additional surfaces, which generate a transverse force $Q_2$ due to their inclination relative to a pressure force D applied for welding the shells. This transverse force $Q_2$ offsets a transverse force $Q_1$ which is generated as a result of the inclination of partial regions of the partition line relative to the applied pressure force D. In this way, the transverse forces which arise during production of the intake device may be at least partially offset in the component, so that little or no forces are exerted on the molding tools, and the welding results for the intake pipe may thus be improved.

6 Claims, 2 Drawing Sheets

WELDED INTAKE DEVICE FOR AN INTERNAL COMBUSTION ENGINE

BACKGROUND OF THE INVENTION

The invention relates to an intake device for an internal combustion engine which comprises at least two shells welded together at mating joint surfaces.

Intake devices of this type are known from European Patent Application No. EP 568,560, for example. According to this document, an intake device is constructed as a hollow chambered structure made of synthetic resin material, comprising a plurality of shells welded together which form the hollow chambers provided within the structure. These hollow chambers comprise primarily the collection chamber and the intake ducts which branch off therefrom. The intake ducts in intake devices often have a curved design due to the installation conditions and the required flow geometry. In these cases, the partition line which encompasses the mating joint surfaces for the weld also has a curved design.

To weld the shells of the intake device, a joining force is applied which ideally is perpendicular to the alignment of the partition line. A compromise must therefore be made when curved partition lines are present, since the effective joining force provided is diminished for the welding of partition lines which are obliquely inclined to the welding direction. According to EP 568,560, it is possible to achieve an inclination to a plane perpendicular to the direction of the welding force ("welding direction" for short) up to not substantially exceeding 60°.

Accordingly, the welding direction is most advantageously specified when the curved partition line has a similar angle on both ends with respect to the direction of the welding force. The transverse forces which arise during welding as a result of the inclination of the partition line are thereby compensated for or offset. Frequently, however, as a result of the geometry, it is not possible to orient the pressure force for the welding in the optimum way described above. Specifically, the shells of the intake pipe often have an outer contour which does not allow the welding tool to be applied in the ideal welding direction, thus requiring a deviation therefrom. In this case, disadvantageous transverse forces arise during the welding process which must be compensated for by appropriately dimensioning the welding tools or the welding machine. Designing the equipment to accommodate the high transverse forces thus results in additional costs which adversely affect the economy of the welded intake pipe. In addition, the transverse forces can cause the shells to shift during the welding process, resulting in lowered quality of the welding seam and tolerance problems with the finished parts.

SUMMARY OF THE INVENTION

The objects of the invention, therefore, are to provide an intake device for an internal combustion engine which can be welded independent of the external geometry, thereby obtaining an optimal result with regard to the economy and quality of the welding seam.

These and other objects are achieved in accordance with the present invention by providing an intake device for an internal combustion engine, comprising an inlet, cylinder-side outlets for combustion air, and duct structures which form communicating connections between the inlet and the outlets, wherein the duct structures are formed at least partially by at least two shells welded together along a partition line under application of a welding pressure force; the partition line being defined by mating joint surfaces on the shells which at least in partial regions are oriented at an angle of less than 90° relative to the welding pressure force; wherein the application of the welding pressure force on the sum of the partial regions generates a first transverse force $Q_1$ relative to the welding pressure force during welding of the intake device, and wherein additional mating surfaces are arranged within the shells which during application of the welding pressure force create a second transverse force $Q_2$ relative to the welding pressure force, the second transverse force $Q_2$ at least partially offsetting the first transverse force.

The invention is based on the principle that at least partial compensation must be made for the transverse forces resulting from the geometry of the partition line and the choice of the welding direction. If this compensation is achieved by forming contacting surfaces which are involved in the welding, the transverse forces can be offset or equalized in the component itself. Thus, the transverse forces are not transmitted to the molds, but instead are intercepted by the component itself. As a result, the welding tools may be designed with smaller dimensions, so that the components may be produced more economically.

In addition, the compensation of transverse forces resulting from the component geometry produces better welding results with respect to quality of the welding seams, since equalization of the transverse forces prevents the two shells to be welded from shifting in the direction of the transverse forces. The described measures also allow the intake devices to satisfy more stringent dimensional tolerance requirements. This further simplifies the installation of the intake pipe on the internal combustion engine, thereby increasing the economy of the proposed solution.

The intake device according to the invention comprises at least two duct structures which connect an inlet for combustion air to cylinder-side outlets in a known manner. The cylinder-side outlets are usually integrated into a cylinder head flange which facilitates installation of the intake device on the internal combustion engine. The inlet generally opens into a collection chamber from which at least one intake duct per cylinder leads to the cylinder-side outlets. The collection chamber therefore serves to distribute the combustion air to the individual cylinders. The described minimum requirements for the geometry of the duct structures can be supplemented by additional functions. For example, longer and shorter intake ducts may be provided which are switched by corresponding valves, depending on the operating mode of the internal combustion engine.

In order to satisfy the complex geometric requirements for the duct structures, the duct structures are formed at least partially from at least two shells which have a partition line along which the shells may be welded together upon application of a pressure force. For this purpose the vibration welding method is particularly useful, in which a high-frequency relative motion between the shells is produced which causes the shells to fuse at joint surfaces which mate with each other along the partition line, thereby joining the shells. Any desired number of individual shells may be combined with one another if adaptations are made for the complexities of the geometry of the intake device.

To form the geometry of the duct structures, the partition line between the shells is configured, in at least partial regions, at an angle of less than 90° with respect to the pressure force required for welding. As already mentioned, this results in creation of transverse forces during the welding. The partition line has corresponding joint surfaces in the intake pipe according to the invention. Joint surfaces in the sense of the invention refer to those surfaces that are necessary to join the two shells to one another so that the intake device forms a sealed, hollow chambered structure which can withstand the required bursting pressure. The sum of the partial regions having an angle less than 90° with respect to the pressure force results in a first transverse force which is not zero and which is transmitted to the welding tools.

The intake device according to the invention is characterized by the fact that within the shells are arranged corresponding additional surfaces which at least partially compensate for the first transverse force by creating a second transverse force which opposes the first transverse force. Preferably, of course, the first transverse force is completely offset; however, the described advantages of the invention are also obtained to a lesser extent even when the transverse force is only partially offset.

Corresponding additional surfaces in the sense of the invention refer to those surfaces which are not necessary for forming a sealed cavitated structure in the manner previously described, but which instead are provided solely to create the second transverse force. It is understood that these surfaces may take on functions resulting from the construction of the intake pipe. For example, additional partitions may be integrated into the cavitated structure of the intake device. Other possibilities for the design of corresponding additional surfaces are addressed in more detail hereinafter.

According to one advantageous embodiment of the inventive concept, the partition line is designed with a continuous curvature. As a result of this design, there are no abrupt changes in the course of the angle of the partition line for aligning the welding force. Weak points on the welding seam in the walls of the intake device may thus be avoided. In addition, the continuously curved partition lines simplify in particular the production of the intake ducts, which are also advantageously curved.

According to another advantageous embodiment of the invention, the described additional surfaces may comprise a widening of the joint surfaces. Widening of the joint surfaces is provided, for example, on the side of the curved joint line which creates the smaller transverse force with respect to the welding direction. This results in equalization of the transverse forces, in which the total sum of the first transverse forces offsets the total sum of the second transverse forces.

Widening of the joint surface refers to an enlargement of the joint surface by an amount which is not necessary to create a secure connection between the shells of the intake device. In the sense of the invention, the entire width of the welding bead provided in the partition line is thus created from the joint surface, which has a minimum width for creating the secure connection, and an additional surface extending on the other side of this joint surface, level with the widening of the joint surface.

The described design advantageously represents an elegant variant for accommodating the joint surfaces in the intake pipe. These joint surfaces disappear in the welding catching edge formed by the partition line, so that the intake pipe according to the invention does not differ in appearance from the intake pipes of the prior art. Finally, the wider welding edge may also provide the intake pipe with increased strength.

A further advantageous embodiment of the invention envisions that the corresponding additional surfaces are provided inside the shells. This has the considerable advantage that the demands for seal-tightness placed on the joined additional surfaces are significantly less than those placed on the joint surfaces on the walls of the intake device. The structures which have the corresponding additional surfaces may also perform other functions in the intake pipe. For example, these structures may form partitions which conduct the intake air flow or improve the acoustics of the intake noise. Furthermore, after the intake pipe is welded, the additional surfaces can no longer be detected from the outside, so that the appearance of the intake device is not impaired.

A further advantageous variant of the intake pipe provides that the corresponding additional surfaces are integrated into mountings or connection points for attaching the intake device or additional units. Such connection points are externally attached to the intake device and may comprise, for example, mounting flanges. Additional units that could be attached to these connection points include, for example, fuel injection nozzles or a servomotor for switch valves in the intake pipe. Furthermore, the intake device must be mounted in the engine compartment, which can be externally accomplished via the cylinder head flange or other connection points. Use of resilient or elastic connecting elements, for example, can achieve a vibration damping effect.

The incorporation of the additional surfaces into the connection points has the advantage that no additional materials are required as the result of providing the additional surfaces. In addition, the connection points may be advantageously disposed in the vicinity of the partition line, thereby facilitating ejection of the shells of the intake device from their respective casting molds.

In accordance with a further advantageous embodiment of the invention, the additional surfaces are inclined so greatly that their angles α relative to pressure force D are less than 24°. As a result, the additional surfaces produce a large transverse force in relation to their area. The problems that can arise from reduced welding seam quality as a result of the lower effective welding force can be eliminated, in particular by providing the additional surfaces in the interior of the intake device, since the pressure differences inside the intake device are significantly lower compared to the surrounding environment.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
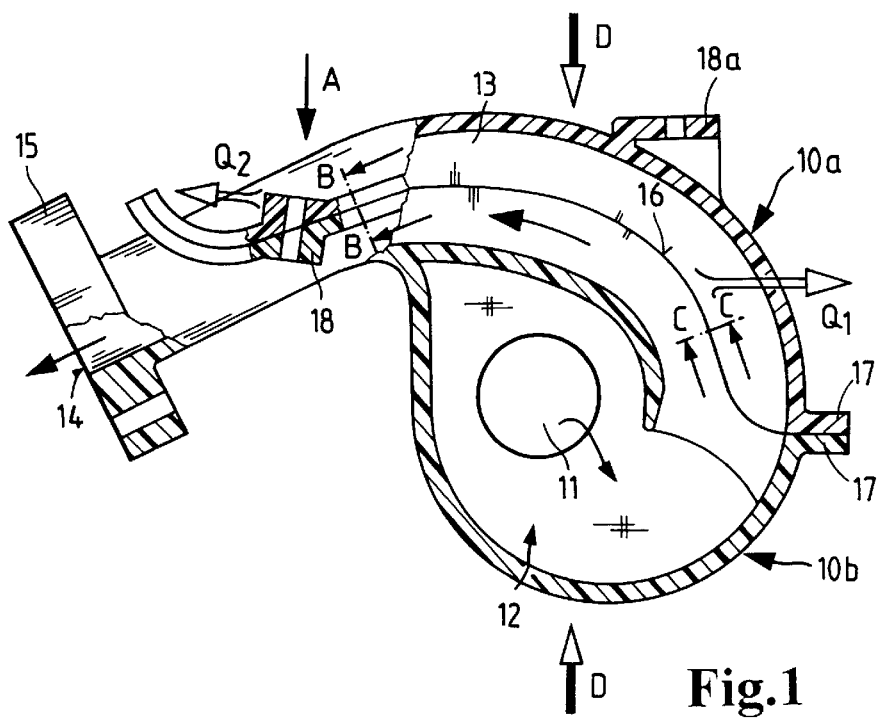
FIG. 1 is a schematic partial section through an intake device manufactured using a clamshell technique.

The intake device shown in FIG. 1 is constructed in a known manner from two shells 10a and 10b. These shells form the intake path for combustion air, the flow of which is indicated by narrow solid arrows. The combustion air flows through inlet 11 into collection chamber 12 of the intake device and exits the collection chamber through intake ducts 13, one of which is depicted in a sectional view, through which the air is conducted to cylinder-side outlets 14. With the assistance of cylinder head flange 15, the cylinder-side outlets are connected to a cylinder head of an internal combustion engine (not shown).

The two shells 10a and 10b form a partition line 16 and are provided with welding edge 17, indicated in schematic form. The two shells may be welded together via this welding edge by application of welding force D. During the welding process, transverse force $Q_1$ arises as the result of the geometry of the partition line, which is continuously curved and therefore has partial regions having an angle less than 90° with respect to the direction of pressure force D. During welding, the transverse force causes a tendency for the shells 10a and 10b to be displaced relative to one another. On the one hand, this tendency is absorbed by the counterforce created by the welding tools (not shown), and on the other hand a second transverse force $Q_2$, formed by mounting point 18, opposes first transverse force $Q_1$, thereby offsetting the transverse forces within the structure of the intake device. Transverse forces $Q_1$ and $Q_2$ respectively represent the resulting transverse forces created by the inclination of joint surfaces ($Q_1$) and, among others, by additional surfaces 19 ($Q_2$) formed by the connection point.

Figure 2:
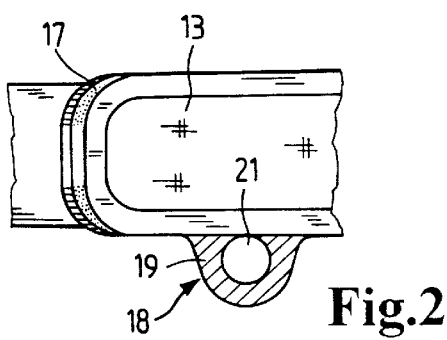
FIG. 2 is partially cutaway detail view in the direction of arrow A of FIG. 1.
Figure 3:
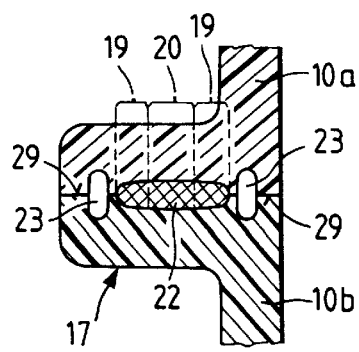
FIG. 3 is a sectional view taken along line B–B of FIG. 1.
Figure 4:
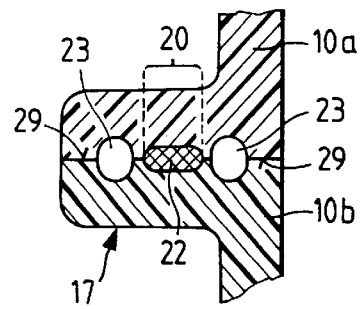
FIG. 4 is a sectional view taken along line C–C of FIG. 1.

The formation of additional surfaces 19 and joint surfaces 20 in the partition line of the intake device according to FIG. 1 can be seen in FIGS. 2 through 4. FIG. 2 shows that welding edge 17 extends transversely across one of intake ducts 13. Also shown is mounting point 18, which has a bore 21 for accepting a mounting bolt (not shown). The mounting point is shown in a partial cutaway view in such a way that the additional surface 19 is shown as a crosshatched cutaway region.

FIG. 1 shows additional mounting point 18a. This mounting point is not situated in the vicinity of partition line 16, but, rather, on the surface of shell 10a. This mounting point results in a limitation of the choice of direction D of the welding force for welding shells 10a and 10b to each other. Thus, the direction of welding pressure force D is chosen as shown in FIG. 1, and cannot be further inclined to decrease the magnitude of first transverse force $Q_1$.

FIGS. 3 and 4 illustrate views of the welding edge 17 corresponding to the section lines B–B and C–C in FIG. 1.

FIG. 4 shows the welding edge in the region of section C–C. The figure shows that there is a fusion zone 22 within the welding edge which in its full width creates joint surface 20. Joint surface 20 is bordered by hollow chambers 23 which are formed between the joint surfaces and support faces 29. The support faces limit the axial motion of shells 10a and 10b during the application of the welding pressure force D.

In welding edge 17 according to FIG. 3 (section B–B in FIG. 1), fusion zone 22 has a different width. The full width of the fusion zone shown in the drawing is not needed to provide the required bursting strength to the intake device. Instead, joint surface 20 would suffice for this purpose. To create second transverse force $Q_2$ according to FIG. 1, further additional surfaces 19 according to FIG. 3 are each provided on the left and right side of joint surface 20, as well as the additional surfaces 19 of mounting point 18 according to FIG. 2. The resulting fusion zone 22, which is enlarged in comparison to that represented in FIG. 4, at the same time has increased strength. Hollow chambers 23 are thus correspondingly smaller.

Figure 5:
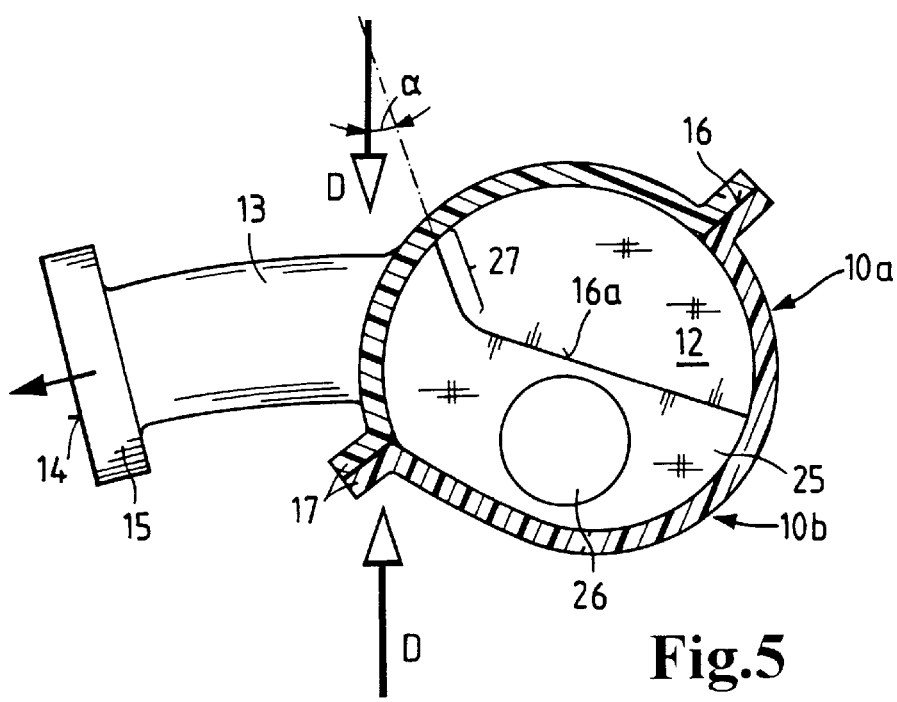
FIG. 5 is a partial section through an alternative embodiment of an intake device according to the invention.

Another variant of an intake device is depicted in FIG. 5. Identical or corresponding parts are identified by the same reference numbers used in FIG. 1. The inlet, however, is not shown. In a cutaway view of collection chamber 12 it can be seen that partition 25, which has resonance opening 26, divides the collection chamber into two partial volumes of equal size. This partition is divided by partition line 16a and is formed by the two shells 10a and 10b together, on which the sections of the partition are molded. For partial region 27 of partition line 16a, this results in an angle α with respect to welding pressure force D which is less than 24°. It is further shown that the inclination of partial region 27 of partition line 16a relative to the direction of welding pressure force D, as well as in the remaining region, has an opposite tendency in comparison to partition line 16, whose position may be determined by means of welding edges 17 and which has a flat design in this embodiment.

Figure 6:
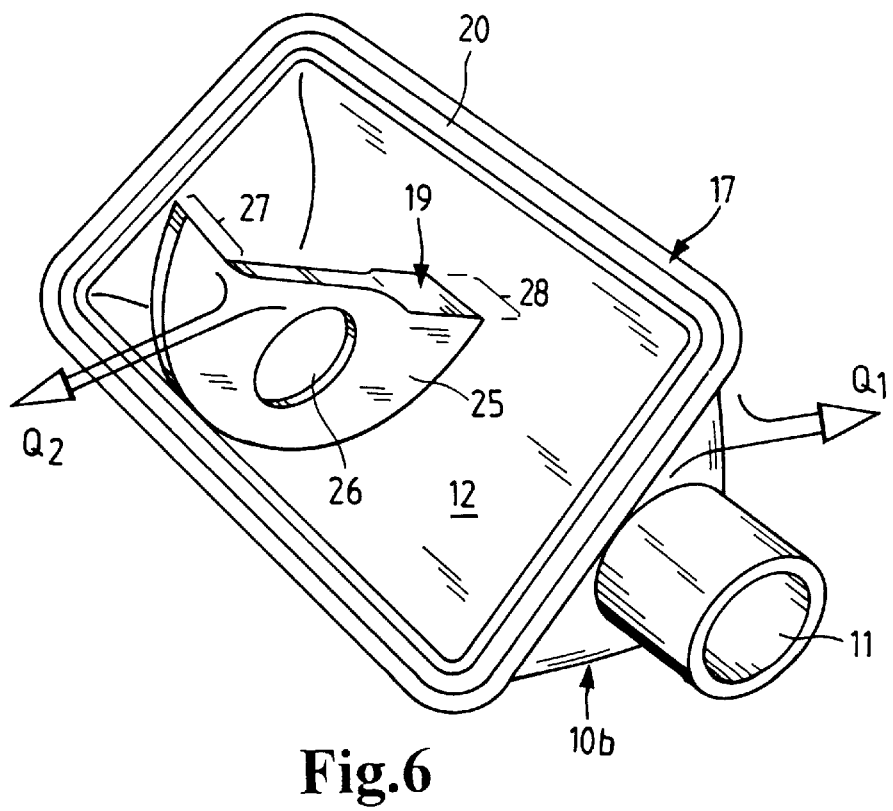
FIG. 6 is a perspective view of the lower shell of the intake device of FIG. 5.

FIG. 6 depicts shell 10b of the intake device in a perspective view. It can be seen that joint surface 20 as described has an orientation opposite to that of additional surface 19. Additional surface 19 is formed by partition 25, with a widened region 28 being disposed on one end to increase the transverse force $Q_2$ which acts on represented shell 10b. This transverse force opposes transverse force $Q_1$ which is created by joint surface 20.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An intake device for an internal combustion engine, comprising an inlet, cylinder-side outlets for combustion air, and duct structures which form communicating connections between said inlet and said outlets, wherein the duct structures are formed at least partially by at least two shells welded together along a partition line under application of a welding pressure force; said partition line being defined by mating joint surfaces on the shells which at least in partial regions are oriented at an angle of less than 90° relative to said welding pressure force; wherein the application of the welding pressure force on the sum of said partial regions generates a first transverse force $Q_1$ relative to said welding pressure force during welding of the intake device, and wherein additional mating surfaces are arranged within the shells which during application of the welding pressure force create a second transverse force $Q_2$ relative to said welding pressure force, said second transverse force $Q_2$ at least partially offsetting said first transverse force.

2. An intake device according to claim 1, wherein the partition line is continuously curved.

3. An intake device according to claim 1, wherein said additional mating surfaces comprise a widening of the joint surfaces.

4. An intake device according to claim 1, wherein said additional mating surfaces are situated inside the shells.

5. An intake device according claim 1, wherein said additional mating surfaces are integrated into mounting points provided for mounting the intake device or for attaching other engine components to the intake device.

6. An intake device according to claim 1, wherein said additional mating surfaces at least partially have an angle $\alpha$ relative to welding pressure force D which is less than 24°.

* * * * *